(12) United States Patent
Schneider et al.

(10) Patent No.: US 10,493,979 B2
(45) Date of Patent: Dec. 3, 2019

(54) METHOD FOR OPERATING A DRIVE DEVICE FOR A MOTOR VEHICLE AND CORRESPONDING DRIVE DEVICE

(71) Applicant: AUDI AG, Ingolstadt (DE)

(72) Inventors: Michael Schneider, Stammham (DE); Henrik Kaartometsä, Gaimersheim (DE); Bernhard Brückl, Gerolsbach (DE)

(73) Assignee: AUDI AG, Ingolstadt (DE)

( * ) Notice: Subject to any disclaimer, the term of this patent is extended or adjusted under 35 U.S.C. 154(b) by 262 days.

(21) Appl. No.: 15/818,194

(22) Filed: Nov. 20, 2017

(65) Prior Publication Data

US 2018/0208180 A1    Jul. 26, 2018

(30) Foreign Application Priority Data

Jan. 23, 2017  (DE) .................. 10 2017 200 982

(51) Int. Cl.
*B60W 20/40* (2016.01)
*B60W 50/00* (2006.01)
*F16D 48/06* (2006.01)

(52) U.S. Cl.
CPC ............. *B60W 20/40* (2013.01); *F16D 48/06* (2013.01); *B60Y 2200/92* (2013.01); *B60Y 2300/42* (2013.01); *F16D 2500/10412* (2013.01); *F16D 2500/3067* (2013.01); *F16D 2500/3069* (2013.01); *F16D 2500/50287* (2013.01); *Y10S 903/946* (2013.01)

(58) Field of Classification Search
CPC ......... B60W 20/40; B60W 2050/0008; B60W 2050/0012; B60W 2710/027; B60W 2050/0009; B60W 2050/001; F16D 2500/10412; Y10S 903/946
See application file for complete search history.

(56) References Cited

U.S. PATENT DOCUMENTS

| | | | | |
|---|---|---|---|---|
| 4,982,822 | A * | 1/1991 | Petzold | B60W 30/18 192/3.58 |
| 9,109,647 | B2 * | 8/2015 | Redbrandt | B60W 10/02 |
| 9,663,107 | B2 * | 5/2017 | Kim | B60W 30/18027 |
| 2005/0071065 | A1 * | 3/2005 | Zimmermann | B60W 10/02 701/51 |
| 2009/0017988 | A1 | 1/2009 | Reuschel | |
| 2009/0209383 | A1 * | 8/2009 | Olson | F16D 48/066 475/120 |
| 2012/0234123 | A1 * | 9/2012 | Whitney | F16H 61/143 74/473.1 |

FOREIGN PATENT DOCUMENTS

| | | |
|---|---|---|
| DE | 101 61 982 A1 | 7/2002 |
| DE | 10230611 A1 | 1/2003 |
| DE | 20 2005 019 996 U1 | 4/2006 |
| DE | 10 2011 079 079 A1 | 1/2013 |
| EP | 2011681 A2 | 1/2009 |
| EP | 2 300 296 B1 | 8/2013 |
| WO | 2007099003 A1 | 9/2007 |

OTHER PUBLICATIONS

German Search Report dated Sep. 25, 2017 of corresponding German application No. 10 2017 200 982.9; 6 pgs.
European Search Report dated Feb. 6, 2018 of corresponding European application No. 17197203.7; 8 pgs.

* cited by examiner

*Primary Examiner* — Sherry L Estremsky
(74) *Attorney, Agent, or Firm* — Maier & Maier, PLLC

(57) ABSTRACT

A method for operating a drive device for a motor vehicle including an internal combustion engine and an electrical machine. A drive shaft of the internal combustion engine can be coupled to a machine shaft of the electrical machine by a shift clutch. The shift clutch is opened in a first shift state for decoupling the internal combustion engine and the electrical machine, and is closed in a second shift state for coupling the internal combustion engine and the electrical machine. When a switching occurs from the first shift state to the second shift state, a clutch target torque that is set at the shift clutch is determined in a first mode of operation by a closed-loop control, and in a second mode of operation is determined by an open-loop control.

10 Claims, 1 Drawing Sheet

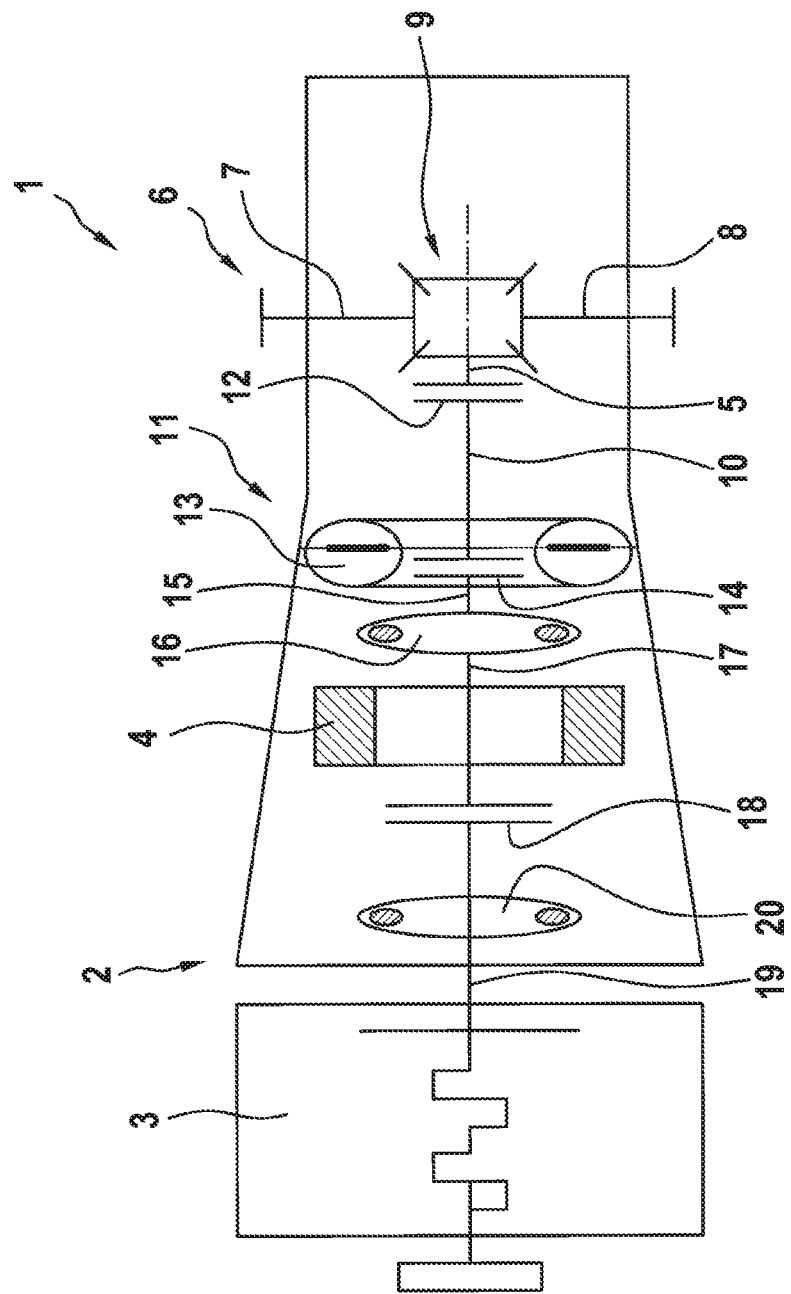

METHOD FOR OPERATING A DRIVE DEVICE FOR A MOTOR VEHICLE AND CORRESPONDING DRIVE DEVICE

FIELD

The invention relates to a method for operating a drive device for a motor vehicle that has an internal combustion engine and an electrical machine, wherein a drive shaft of the internal combustion engine can be coupled to a machine shaft of the electrical machine by means of a shift clutch, wherein the shift clutch is opened in a first shift state for decoupling the internal combustion engine and the electrical machine and is closed in a second shift state for coupling the internal combustion engine to the electrical machine. In addition, the invention relates to a drive device.

BACKGROUND

The drive device serves for driving the motor vehicle with respect to supplying a torque directed at driving the motor vehicle. The drive device has a plurality of drive assemblies, wherein a first of the drive assemblies is configured as an internal combustion engine and a second of the drive assemblies is configured as an electrical machine. Therefore, the drive device is present as a hybrid drive device. In addition to the drive assemblies, the drive device provides the change-gear transmission, which in turn has a transmission input shaft and a transmission output shaft. With the aid of the change-gear transmission, different gear ratios can be adjusted between the transmission input shaft and the transmission output shaft, or a gear ratio that is selected from a plurality of different ratios can be adjusted.

The internal combustion engine provides the drive shaft, which corresponds, for example, to a crankshaft of the internal combustion engine or is coupled to the latter, preferably rigidly and/or permanently. The electrical machine, in contrast, has the machine shaft, which in turn is coupled to a rotor of the electrical machine, likewise preferably rigidly and/or permanently. The drive shaft of the internal combustion engine and the machine shaft of the electrical machine can be coupled by means of the shift clutch. This means that in the first shift state of the shift clutch, the drive shaft is coupled to the machine shaft, preferably rigidly, thus resistant to rotation or slip-free. For this purpose, in the first shift state—with corresponding configuration of the shift clutch, for example as a multidisk clutch—an overpressing of the shift clutch can be provided, so that in the case of torques that usually occur during the operation of the drive device, a slipping of the shift clutch does not occur.

In the second shift state, in contrast, the shift clutch is opened, at least partially, in particular completely. Thus, preferably, in the second shift state, the drive shaft is completely decoupled from the machine shaft. The machine shaft of the electrical machine is coupled, and/or at least can be coupled, to the transmission input shaft of the change-gear transmission, preferably rigidly and/or permanently. The transmission output shaft of the change-gear transmission in turn is coupled, and/or at least can be coupled, to the driven shaft of the drive device, in particular rigidly and/or permanently.

The driven shaft of the drive device is understood to be a shaft to which the drive device supplies the drive torque to be used for driving the motor vehicle. In this regard, the driven shaft is coupled, or at least can be coupled, for example, to a wheel axle of the motor vehicle or at least to a wheel of the motor vehicle, in particular rigidly and/or permanently. For example, the machine shaft, on one side of the electrical machine is connected to the shift clutch, and, on the other side of the electrical machine, it is connected to the transmission input shaft. The electrical machine can be arranged coaxial to the transmission input shaft. Other arrangements of the electrical machine can also be realized, however.

SUMMARY

The object of the invention is to propose a method for operating a drive device for a motor vehicle that has advantages when compared with known methods, in particular, makes possible a rapid equalizing of the rotational speeds of the internal combustion engine and of the electrical machine, and/or makes possible a smooth coupling of the internal combustion engine to the electrical machine, particularly after a start of the internal combustion engine.

In this case, it is provided that when a switching is made from the first shift state to the second shift state, a clutch target torque in a first mode of operation, which is set at the shift clutch, is determined by means of a regulated or closed-loop control, and in a second mode of operation is determined by means of an open-loop control.

For a start-up of the internal combustion engine, the latter is first dragged along or entrained, for example, preferably up to a minimum speed or an idling speed. The minimum speed is preferably understood to be a rotational speed of the internal combustion engine, starting from which it can increase automatically; thus its rotational speed can increase automatically when operation is started up, without the influence of an external torque. In contrast, the idling speed is the rotational speed of the internal combustion engine, which is usually adjusted for this engine when the internal combustion engine will not contribute to supplying the drive torque to the driven shaft. The idling speed in this case is usually higher than the minimum speed, and is preferably selected such that an operation of the internal combustion engine is present that is as smooth and noise-free as possible. Prior to the start-up, the internal combustion engine usually has a rotational speed that is equal to zero or at least is smaller than the minimum speed and/or the idling speed.

The internal combustion engine is entrained, for example, by means of a starter and/or by at least partial closing of the shift clutch. It can thus be provided that the internal combustion engine is entrained by means of the starter with a simultaneously opened shift clutch, or that—in particular, as long as a separate starter is not present—the entrainment is produced only by the at least partial closing of the shift clutch. In the latter case, the internal combustion engine is particularly entrained in this regard by means of the electrical machine or by means of kinetic energy of the motor vehicle. The shift clutch can be configured basically in any way; in particular, it is present as a force-fit shift clutch, for example as a multidisk clutch.

If the internal combustion engine has reached a rotational speed, starting from which operation takes place without applying an external torque, thus particularly the minimum speed, the shift clutch is opened, in particular fully opened, as long as this was not already the case previously. Subsequently, the rotational speed of the internal combustion engine is equalized to the rotational speed of the electrical machine, or the rotational speed of the drive shaft is equalized to the rotational speed of the machine shaft. Subsequently, the shift clutch shall be closed for coupling the internal combustion engine and the electrical machine. In this regard, a switching from the first shift state to the second shift state is provided.

In summary, it is thus preferably provided with a view to the rotational speed of the internal combustion engine, to initiate the start-up of the internal combustion engine, when the latter has a speed that is less than the minimum speed, in particular, when it is equal to zero. For start-up, the shift clutch is closed at least partially, so that the internal combustion engine is entrained by the electrical machine, or the internal combustion engine is entrained by means of the starter. This is produced in both cases, so that the rotational speed of the internal combustion engine increases. When the internal combustion engine has reached the minimum speed or the idling speed, the shift clutch—as long as it was closed prior to this—again opens, in particular fully opens, or it remains open. Subsequently, the internal combustion engine is placed in operation, so that its rotational speed or the rotational speed of the drive shaft is further increased, namely in the direction of the rotational speed of the electrical machine or the machine shaft. After this, the switch clutch is closed, thus the drive shaft is coupled to the machine shaft, and consequently, there is a switch from the first shift state to the second shift state.

The switching from the first shift state to the second shift state is produced, in particular, after starting up the internal combustion engine, but it can also be produced basically in other operating states of the drive device. The target torque of the clutch is determined during the switching and is set at the shift clutch. The clutch torque actually transferred by the shift clutch is adjusted to the set target torque of the clutch, in particular controlled in open-loop and/or in closed-loop to the clutch target torque.

For example, it is thus provided overall to first start up the internal combustion engine, for example, with an at least partially closed shift clutch, to entrain it by means of the electrical machine, i.e., up to the minimum speed. Subsequently, the shift clutch is opened again, in particular fully opened, so that the first shift state is present. Following this, the rotational speed of the internal combustion engine is adjusted to the rotational speed of the electrical machine. As soon as a difference between the two rotational speeds goes below a specific speed difference, the switching from the first shift state to the second shift state is initiated.

During the switching, the target torque of the clutch, which is equal to zero in the first shift state, is now increased, in particular up to a value at which a slip-free operation of the shift clutch is present. If the slip-free operation of the shift clutch is reached, then after this, an overpressing of the clutch can also be adjusted, by means of which no slip of the shift clutch is to be expected in the case of torque that usually occurs during the operation of the drive device.

The clutch torque that is adjusted or is to be adjusted at the shift clutch is determined in the first mode of operation by means of the closed-loop control and in the second mode of operation by means of the open-loop control. In the framework of the closed-loop control, for example, it is provided to use the difference between the rotational speed of the internal combustion engine and the rotational speed of the electrical machine or the difference between the rotational speed of the drive shaft and the rotational speed of the machine shaft as the closed-loop control difference. In this regard, in the framework of the closed-loop control, the target torque of the clutch serving as the manipulated variable is adjusted by the control in such a way that the rotational speed of the internal combustion engine corresponds to the rotational speed of the electrical machine.

In the second mode of operation, which can be conducted alternatively to the first mode of operation, in contrast, the determination of the target torque of the clutch is made by means of the open-loop control. This means that the clutch target torque is determined independently from the rotational speed of the internal combustion engine and/or the rotational speed of the electrical machine and is set at the shift clutch. Preferably, the second mode of operation is carried out and therefore, the clutch target torque is determined by means of the open-loop control until the shift clutch is completely closed, thus until a clutch target torque is reached at which slip of the shift clutch no longer occurs.

For example, in the framework of the open-loop control, a specific course of the clutch target torque is stored over time. It can also be provided at the beginning of the second mode of operation to uniquely establish the course of the clutch target torque over time, for example, with the use of the rotational speed of the internal combustion engine and/or the rotational speed of the electrical machine or the difference between these two rotational speeds. Subsequently, the clutch target torque is determined only by means of the open-loop control based on this course.

Determining and adjusting the clutch target torque is preferably carried out periodically or continuously; thus it is preferably repeated, and in this regard is conducted many times until the shift clutch is completely closed. A rapid and smooth closing of the shift clutch when switching from the first shift state to the second shift state can be achieved in all operating states of the drive device by means of such a procedure.

Another embodiment of the invention provides that the closed-loop control is produced with the use of a P-control element and/or an I-control element, and/or is pre-controlled. The difference in rotational speeds as the closed-loop control difference serves as input variable for the closed-loop control element or control elements, as has already been explained above. The closed-loop control determines the clutch target torque as the manipulated variable, which is subsequently set at the shift clutch. In addition to the at least one closed-loop control element, a pre-control can be provided within the framework of the closed-loop control. For example, it can first be provided to carry out the closed-loop control only by means of the P-control element, wherein the pre-control is produced optionally. As soon as it has been established that the difference in rotational speeds cannot be reduced sufficiently rapidly, then the I-control element can be additionally drawn on.

An enhancement of the invention provides that the open-loop control carries out an increase in the clutch target torque based on a time-dependent torque course or curve. The use of such a torque course has already been indicated above. For example, the torque course or curve is determined once at the beginning of conducting the second mode of operation and subsequently is drawn on for determining the clutch target torque by means of the open-loop control. For example, the torque curve is determined on the basis of the actual clutch torque transferred instantaneously by the shift clutch, the rotational speed of the internal combustion engine, and/or the rotational speed of the electrical machine. Also, a constant time period can be given in advance, within which the shift clutch shall be completely closed, starting from the instantaneous shift state.

The torque curve, for example, corresponds to a constant increase in the clutch target torque over time, thus an increase in the clutch target torque with constant gradient. The length of the time period is usually selected such that in fact, on the one hand, a synchronization that is as rapid as possible will be achieved between the internal combustion engine and the electrical machine, but, on the other hand, there is no influencing of a longitudinal acceleration of the motor vehicle, thus no delay or acceleration perceptible to the driver.

Within the scope of a preferred embodiment of the invention, it is provided that the open-loop control increases the clutch target torque continuously and/or with constant gradient. The continuous increase in the clutch target torque is understood to be an incessant increase, so that the time gradient of the clutch target torque is thus always different than zero; in particular, it is greater than zero. The clutch target torque is preferably also increased steadily, thus without the occurrence of jumps or discontinuities in the course of the clutch target torque. This can be realized simply by the increase of the clutch target torque with constant slope, i.e., with constant gradient over time.

Another preferred embodiment of the invention provides that a greater slope is used in the case of a smaller difference between the rotational speed of the drive shaft and the rotational speed of the machine shaft than in the case of a larger difference in rotational speeds. In this regard, a more rapid increase in the clutch target torque is provided in the case of a first difference in rotational speeds than in the case of a second difference, wherein the first difference in rotational speeds is smaller than the second difference. Conversely, in the case of the larger second difference in rotational speeds, a slower increase in the clutch target torque is thus realized. With such a procedure, a rapid bypassing of only small differences in rotational speeds is realized, and at the same time—in the case of larger differences—a smooth equalization of the rotational speed of the drive shaft to the rotational speed of the machine shaft is realized.

Another preferred embodiment of the invention provides that in the case of switching, initially the first mode of operation is conducted, and when the difference in rotational speeds falls below a threshold value due to a difference gradient in rotational speeds, and/or when a threshold value for difference in rotational speeds is exceeded due to the difference in speeds, a change is made from the first mode of operation to the second mode of operation. If the switch from the first shift state to the second shift state is initiated, then initially the first mode of operation shall be drawn on; thus the clutch target torque will be determined by means of the closed-loop control.

Upon encountering precisely one, at least one, or only when encountering both of the named conditions, it is now provided that a change is made from the first mode of operation to the second mode of operation; thus the clutch target torque is subsequently determined by means of the open-loop control. As a condition, for example, the fact that the gradient of the difference in rotational speeds goes below the threshold value can be drawn on. The gradient of the difference in rotational speeds is the time gradient of the difference in rotational speeds, i.e., the difference between the rotational speed of the drive shaft and the rotational speed of the machine shaft. If the gradient of difference in rotational speeds is less than the threshold value, then it can be concluded that the equalization of the rotational speeds is not sufficiently rapidly carried out in the first mode of operation.

Additionally or alternatively, the fact that the difference in rotational speeds exceeds the threshold value of the difference in rotational speeds can be drawn on as a condition. For example, the threshold value of the difference in rotational speeds is set equal to the difference in rotational speeds when the switching is initiated. If it is thus established that the difference in rotational speeds increases again despite conducting the closed-loop control in the first mode of operation, then subsequently, a change can be made to the second mode of operation in order to more rapidly execute the equalization of the rotational speeds.

Another preferred embodiment of the invention provides that after changing to the second mode of operation, the latter is conducted over a specific time period and subsequently is changed back to the first mode of operation, or the second mode of operation is carried out until the second shift state is reached. In this regard, the second mode of operation can be carried out only as an aid within the scope of a first embodiment, in order to transitionally achieve a more rapid equalization of the rotational speeds, whereas the complete switching to the second shift state or the complete closing of the shift clutch is conducted in the first mode of operation.

Correspondingly, for example, it is provided that after the change to the second mode of operation, the latter is conducted over the specific time period, and subsequently a change is made again back to the first mode of operation, i.e., before the second shift state is attained. In this case, the specific time span can have a constant duration; for example, the time period or the length of the time period is established based on the difference in rotational speeds upon changing to the second mode of operation. Alternatively, it can be provided to conduct the second mode of operation until the second shift state is reached as soon as a change has been made from the first mode of operation to the second mode of operation. Correspondingly, the complete closing of the shift clutch shall be produced in the second mode of operation.

An enhancement of the invention provides that a clutch minimum torque which is used for starting up the internal combustion engine and is to be set at least on the shift clutch is determined from a temperature and/or a crankshaft position of the internal combustion engine—in particular when the internal combustion engine is shut down. The clutch minimum torque is the torque that shall at least be transferred by means of the shift clutch. Correspondingly, it is preferably provided that the clutch target torque is always selected greater than or equal to the clutch minimum torque or the clutch minimum torque is modified after it is determined such that it at least corresponds to or is greater than the clutch minimum torque. A clutch torque actually transferred via the shift clutch is preferably set to the clutch target torque, in particular by an open-loop and/or closed-loop control.

The clutch minimum torque is now determined based on the temperature and/or the crankshaft position of the internal combustion engine. For example, the clutch minimum torque is higher, the lower the temperature is. As temperature, for example, a temperature of the internal combustion engine is drawn on, for example, a lubricant temperature. Additionally or alternatively, the crankshaft position that is present prior to starting up, particularly when the internal combustion engine is shut down, is drawn on.

The crankshaft position describes, for example, an angle of rotation by which the crankshaft of the internal combustion engine must be rotated until the upper dead point is reached for that cylinder in which a compression and/or a fuel injection is first conducted. Less mixture needs to be compressed in the case of a small angle of rotation than for a large angle of rotation, since the first cylinder to be ignited is found just in front of its upper dead point. Correspondingly, the clutch minimum torque is selected smaller, the smaller the angle of rotation is.

Another preferred embodiment of the invention provides that the clutch minimum torque is corrected upward if the rotational speed of the internal combustion engine is greater than zero at the beginning of the start-up, or a time duration after a shutdown goes below a pre-specified time duration, whereby the clutch minimum torque is selected greater, the further the time duration goes below the pre-specified time duration. It has already been explained above that the start-up of the internal combustion engine can be produced from any initial rotational speed. If a shutdown of the internal combustion engine preceding the start-up first lags behind for a short time, the rotational speed is greater than zero. Correspondingly, a pre-compressed mixture is already present in the next cylinder, in which a compression shall be conducted.

This makes necessary an increase in the clutch target torque. For example, the increase in the clutch target torque is produced within a specific rotational speed range of the internal combustion engine. As a lower limit, for example, this rotational speed range has a rotational speed of greater than zero, in particular just infinitesimally greater than zero, in which the internal combustion engine is still found in motion when it is shut down. As an upper limit, the rotational speed range can have a rotational speed that is smaller than the minimum speed and/or the idling speed. In particular, the rotational speed is at most 75%, at most 50%, at most 40%, at most 30%, or at most 25% of the minimum speed. If the rotational speed of the internal combustion engine exceeds the rotational speed range, i.e., lies above it, then the increase in the clutch target torque can be disregarded, since the still rotating mass of the internal combustion engine supports the start-up.

If a throttle valve is opened when the internal combustion engine shuts down, then the cylinders of the internal combustion engine are still supplied with full air filling. Correspondingly, a pre-compressed air filling is present in the first cylinder to be compressed. This increased filling is dissipated slowly by way of leaks in the cylinder, for example, in the cylinder seals, after the internal combustion engine shuts down. The increased filling in the first cylinder to be compressed shall be considered in the calculation of the clutch minimum torque. Correspondingly, the time duration after a shutdown preceding the start-up is considered and the clutch minimum torque is corrected upward if the time duration goes below the pre-specified time duration. It is thereby provided that the clutch minimum torque is selected greater, the further the time duration goes below the pre-specified time duration. For example, the clutch minimum torque is reduced linearly over time after the internal combustion engine has been shut down.

Another embodiment of the invention provides that a drive torque that can be supplied by means of the electrical machine is limited to a torque limiting value that is determined from a maximum drive torque of the electrical machine and a torque reserve. The maximum drive torque corresponds to the maximum torque that can be supplied by means of the electrical machine. In this case, the maximum drive torque corresponds preferably to a rated torque at which the electrical machine can be permanently and continuously operated.

The torque limiting value is determined from the maximum drive torque and the torque reserve. The torque limiting value in this case corresponds to the maximum drive torque minus the torque reserve. Due to the provision of the torque reserve, it is assured that a reliable start-up of the internal combustion engine is always possible by means of the electrical machine. Correspondingly, the drive torque, which can be produced by the electrical machine, is limited to the torque limiting value.

In the scope of another advantageous embodiment of the invention, it is provided that the torque reserve is determined from a drag torque required for the start-up of the internal combustion engine. The drag torque corresponds to the torque that is required for entraining the internal combustion engine, in particular for entrainment to the minimum speed and/or the idling speed. The torque reserve is now, for example, set equal to the drag torque.

Another embodiment of the invention provides that the torque reserve is set equal to the drag torque, if an actual torque of the electrical machine is smaller than a maximum drive torque minus the drag torque, and otherwise is set equal to the maximum drive torque minus the actual torque and is subsequently increased. Thus the torque reserve can be supplied unnoticeably to the driver of the motor vehicle, namely by initially selecting the torque reserve such that it does not influence the actual torque and subsequently is slowly increased, so that the actual torque of the electrical machine decreases slowly.

In addition, the invention relates to a drive device for a motor vehicle, in particular for carrying out the method according to the preceding statements, this drive device having an internal combustion engine and an electrical machine, wherein a drive shaft of the internal combustion engine can be coupled to a machine shaft of the electrical machine by means of a shift clutch, wherein the shift clutch is opened in a first shift state for decoupling the internal combustion engine and the electrical machine, and is closed in a second shift state for coupling the internal combustion engine and the electrical machine. In this case, it is provided that the drive device is designed for the purpose that when a switch occurs from the first shift state to the second shift state, a clutch target torque, which is set at the shift clutch, in a first mode of operation is determined by means of a regulated or closed-loop control, and in a second mode of operation is determined by an open-loop control.

The advantages of such a procedure or of such an embodiment of the drive device have already been indicated. Both the drive device as well as the method for its operation can be enhanced according to the preceding statements, so that reference will be made thereto in this regard.

BRIEF DESCRIPTION OF THE FIGURES

The invention will be explained in further detail in the following on the basis of the exemplary embodiments shown, without resulting in any limitation of the invention.

FIG. 1 shows a schematic representation of a drive device for a motor vehicle.

In FIG. 1, the drive train 1 provides a drive device 2, which has in turn an internal combustion engine 3, an electrical machine, and a driven shaft 5. The drive device 2 serves for driving at least one wheel axle 6 of the motor vehicle, which is composed of two axle members 7 and 8, which are coupled to the driven shaft 5 of the drive device 2 via a differential gear 9. The driven shaft 5 is coupled to a transmission output shaft 10 of a change-gear transmission 11 of the drive device 2, in particular rigidly and/or permanently, and/or can be coupled by means of an optional shift clutch 12.

The change-gear transmission 11, for example, may have a torque converter 13 that can provide a converter lockup clutch 14. The change-gear transmission 11 provides a transmission input shaft 15, which is preferably permanently coupled to the torque converter 13. The transmission input shaft 15 can be coupled, in particular, rigidly and/or permanently, to a machine shaft 17 of the electrical machine 4, either directly or—as shown here—by way of a damping device 16, for example, a torsional vibration damper. The electrical machine 4 can be arranged coaxial to the transmission input shaft 15 and/or the transmission output shaft 10.

An operative connection between the internal combustion engine 3 and the electrical machine 4 can be adjusted by means of a shift clutch 18. The shift clutch 18 is thereby present between a drive shaft 19 of the internal combustion engine 3 and the machine shaft 17 of the electrical machine 4. Another damping device 20 can also be optionally provided in the operative connection between the internal combustion engine 3 and the shift clutch 18. The damping device 20 is preferably designed as a dual mass flywheel.

In a first shift state of the shift clutch 18, the internal combustion engine 3 is decoupled from the electrical machine 4. In contrast, in a second shift state, it is coupled to it. Correspondingly, the shift clutch 18 is opened, in particular completely opened, in the first shift state, and it is closed, at least partially, preferably completely, in the second shift state. The complete closing can be understood to mean a closing of the shift clutch 18 with or without clutch overpressing.

Now, if the internal combustion engine 3 is to be coupled to the electrical machine 4, thus there will be a change from the first shift state to the second shift state, then a corresponding switching is carried out. For example, switching is produced directly after a start-up of the internal combustion engine 4. During the switching, provision is made to determine a clutch target torque in a first mode of operation by means of a closed-loop control and in a second mode of operation by means of an open-loop control, and subsequently to set this torque at the shift clutch 18. In this case, the clutch target torque is determined and adjusted continuously or repeatedly in discrete steps.

Within the framework of closed-loop control, it is provided, for example, to determine the clutch target torque with the use of a P-control element or an I-control element. Additionally, a pre-control can be provided. In contrast, the open-loop control provides the use of a time-dependent torque curve, which has a continuously constant slope, for example, so that the clutch target torque, starting from the onset of the second mode of operation, thus from conducting the open-loop control, is increased continuously with constant slope until the second shift state is reached, and consequently, the shift clutch 18 is completely closed.

In this way, in all operating states of the drive device 2, a rapid and comfortable coupling of the internal combustion engine 3 to the electrical machine 4 or of the drive shaft 19 to the machine shaft 17 can be ensured.

The invention claimed is:

1. A method for operating a drive device for a motor vehicle comprising:
an internal combustion engine and an electrical machine, wherein a drive shaft of the internal combustion engine can be coupled to a machine shaft of the electrical machine by a shift clutch, wherein the shift clutch is opened in a first shift state for decoupling the internal combustion engine and the electrical machine, and is closed in a second shift state for coupling the internal combustion engine and the electrical machine, wherein when a switch occurs from the first shift state to the second shift state, a clutch target torque that is set at the shift clutch is determined, in a first mode of operation by a regulated or closed-loop control, and in a second mode of operation by an open-loop control.

2. The method according to claim 1, wherein the closed-loop control is produced with the use of a P-control element and an I-control element, and is pre-controlled.

3. The method according to claim 1, wherein the open-loop control carries out an increase in the clutch target torque based on a time-dependent torque curve.

4. The method according to claim 3, wherein the open-loop control increases the clutch target torque continuously and with constant slope.

5. The method according to claim 1, wherein a greater slope is used in the case of a smaller difference between the rotational speed of the drive shaft and the rotational speed of the machine shaft than in the case of a larger difference in rotational speeds.

6. The method according to claim 1, wherein when switching takes place, initially the first mode of operation is conducted and when there occurs a falling below of a threshold value due to a gradient of the difference in rotational speeds, and when a threshold value for a difference in rotational speeds is exceeded due to the difference in speeds, a change is made from the first mode of operation to the second mode of operation.

7. The method according to claim 1, wherein after the change to the second mode of operation, the latter is conducted over a specific time period, and subsequently is changed back to the first mode of operation, or the second mode of operation is conducted until the second shift state is reached.

8. The method according to claim 1, wherein a clutch minimum torque that is used for the start-up of the internal combustion engine and that is to be at least adjusted at the shift clutch is determined from a temperature and a crankshaft position of the internal combustion engine that is present, when the internal combustion engine is shut down.

9. The method according to claim 8, wherein the clutch minimum torque is corrected upward if the rotational speed of the internal combustion engine is greater than zero at the beginning of the start-up, or a time duration after a shutdown goes below a pre-specified time duration, wherein the clutch minimum torque is selected greater, the further the time duration goes below the pre-specified time duration.

10. A drive device for a motor vehicle for conducting the method comprising:
an internal combustion engine and an electrical machine, wherein a drive shaft of the internal combustion engine can be coupled to a machine shaft of the electrical machine by a shift clutch, wherein the shift clutch is opened in a first shift state for decoupling the internal combustion engine and the electrical machine, and is closed in a second shift state for coupling the internal combustion engine and the electrical machine, wherein when a switching occurs from the first shift state to the second shift state, the drive device is designed for the purpose of determining, in a first mode of operation, a clutch target torque that is set at the shift clutch by a closed-loop control, and in a second mode of operation, of determining the clutch target torque by an open-loop control.

* * * * *